June 15, 1937.  R. F. SYMONDS  2,083,967
PROTECTED DRIVING MECHANISM
Filed May 20, 1936
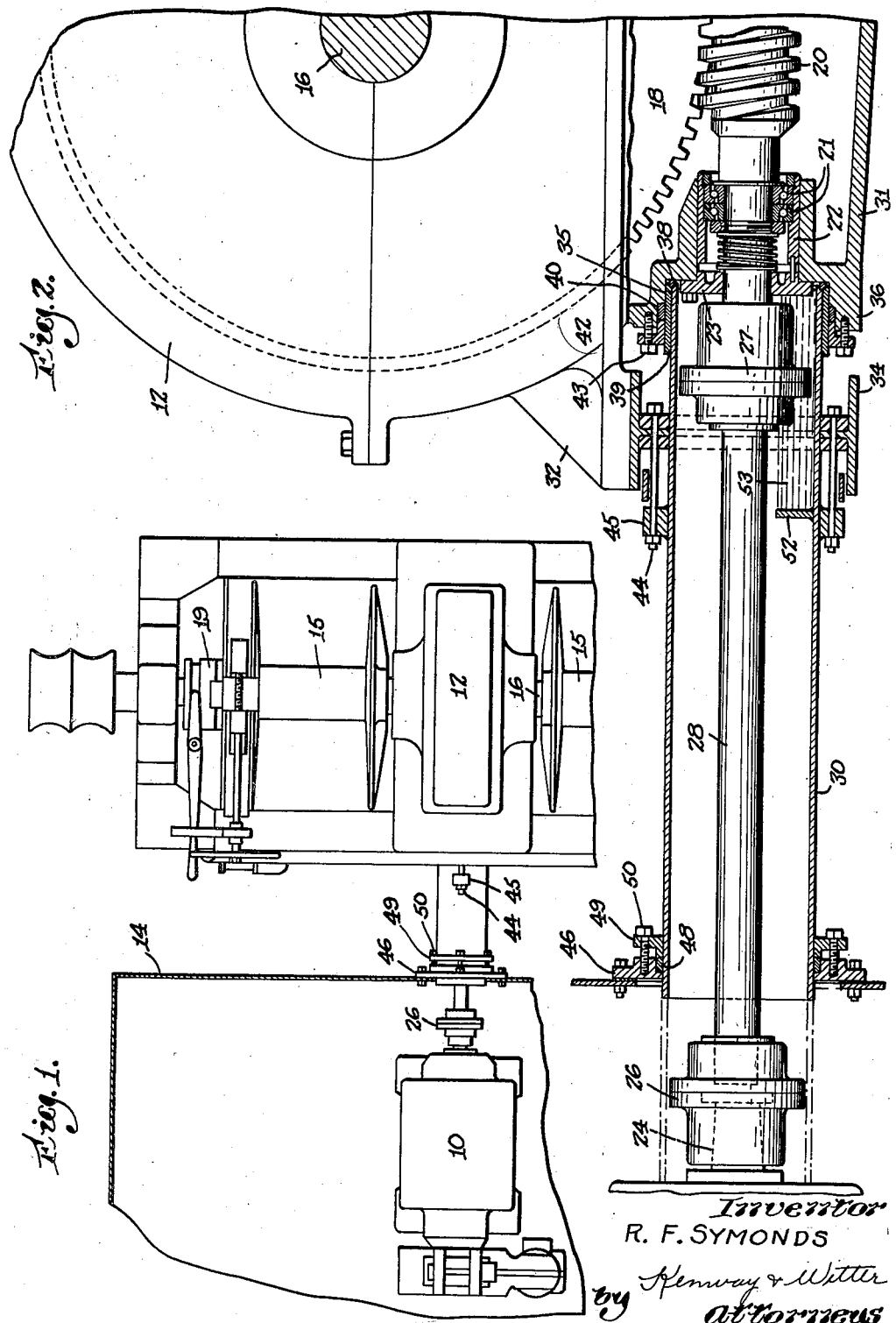
Inventor
R. F. SYMONDS
by Kenway & Witter
Attorneys Patented June 15, 1937

2,083,967

UNITED STATES PATENT OFFICE 2,083,967

PROTECTED DRIVING MECHANISM

Ralph F. Symonds, Marblehead, Mass., assignor to New England Trawler Equipment Co., Boston, Mass., a corporation of Massachusetts Application May 20, 1936, Serial No. 80,777

4 Claims. (Cl. 64—3)

This invention relates to driving and driven units, a driving connection therebetween, and more especially to means surrounding and protecting the driving connection and said units from outside exposure. The invention is particularly useful on boat decks employing cable hauling winches and wherein it is necessary to keep salt water away from the interior of the driving and driven units and from the driving connection therebetween. In such mechanism the winch is commonly mounted on the open deck and may be driven from an electric motor located within the deck house. The shafting connecting the motor and winch usually requires one or more flexible couplings to compensate for the misalignment resulting from the nonrigidity of the deck. During rough weather the deck is frequently awash with the result that salt water seeping into the exposed flexible couplings washes out the lubricant therein and thus materially shortens the life of these parts. Furthermore, the salt water travels along the shafting and thus finds its way into the worm gearing of the winch and the windings of the motor with damaging and ruinous results to both. The primary object of my invention is the production of means for housing and protecting of these mechanisms from such exposure and damage.

In accomplishing the object of the invention as specifically described herein, I provide an elongated or tubular means, such as a single section of tubing, between the two units and house the intermediate driving connection therein. The ends of this tubular means are connected and sealed to the two housings of the driving and driven units whereby not only protecting the shafting from exposure, but also preventing seepage of salt water along the shafting and into these units. The tubular means is furthermore preferably constructed to hold an oil bath for the flexible coupling therein and is also made adjustable whereby the flexible coupling and adjacent parts may be exposed for repairs.

These and other features of the invention will be best understood and appreciated from the following description of a preferred embodiment thereof, selected for purposes of illustration and shown in the accompanying drawing in which, Fig. 1 is a fragmentary plan view of a mechanism embodying my invention.

Fig. 2 is an enlarged fragmentary side elevation thereof partially in section.

The invention herein is particularly applicable to use on the decks of fishing boats and the like which employ one or more winches for hauling the net cables, and I have therefore illustrated such an embodiment of the invention in the accompanying drawing. In such a drawing, 10 indicates an electric motor and 12 indicates a winch driven by the motor. Both such units are mounted on the boat deck and the motor is enclosed within the deck house 14, the wall of the deck house being a part of the ship structure. The winch comprises a pair of cable drums 15 loose on a shaft 16 driven by a worm wheel 18 fixed to the shaft, clutches 19 serving to connect the shaft to the drums. The worm wheel is driven by a worm 20 in engagement therewith. The outer end of the worm shaft is supported by ball bearings 21 within a bushing 22 and by an outer bushing 23.

The motor shaft 24 and worm are connected by shafting including inner and outer flexible couplings 26 and 27 and a floating shaft 28 therebetween, such a free and floating connection being required due to the nonrigidity of the ship structure which permits some misalignment of the shafts 20 and 24. This shafting and the flexible couplings have heretofore been exposed to the salt water which frequently washes the deck during rough weather, and have thus been seriously damaged and their lives thereby materially decreased. This is primarily due to the washing of the lubricant from the flexible couplings, the diluting and emulsifying of the lubricant in the worm gearing by salt water seeping thereinto, and the damage to the motor windings and to electrical apparatus in the engine room below by salt water seeping and dripping thereto. My invention herein provides a secure seal against the exposure to salt water of these parts and thereby eliminates these difficulties.

In the drawing I have illustrated a single section of tubing 30 as surrounding and completely enclosing the shafting 26—28 between the worm gear housing 31 and the wall 14, this tubing being of sufficient size to permit free and necessary wobbling of the shafting. The winch has a supporting bracket 32 resting on a rail 34 and the tubing extends through the web of this rail. The outer end of the tube projects into an opening in the worm gear housing and into and in contact with a bronze sleeve 35 surrounding the worm shaft at 36. Leather packing 38 is provided at the inner ends of the tubing and sleeve 35 and a lead joint seal 39 may also be provided between the tubing and sleeve at the outer end of the sleeve. Further packing 40 is also held in tight contact with the outer surface of the sleeve by means of a bushing 42 secured by tap bolts 43.

The tubing 30 is normally held in the position of Fig. 2 with the ends of the tubing and sleeve 35 in tight contact with the packing 38 by means of bolts 44. These bolts are anchored to the rail 34 and their outer ends extend through lugs 45 carried by the tubing 30. Thus these bolts serve to draw and hold the tubing to the right (Fig. 2) and tightly in contact with the packing 38. The other end of the tubing extends through the wall 14 of the ship structure and is supported at such wall on a packing ring 46. Packing 48 within the ring is held in tight contact with the exterior of the tubing by a bushing 49 secured to the ring by tap bolts 50. Thus the shafting is entirely enclosed from outside exposure and the two ends of the tubing are sealed to the housings 14 and 31.

It may be desirable to provide an oil bath for the flexible coupling 27, and for this purpose I affix a wall 52 to the inner surface of the tubing 30 whereby providing for an oil bath at 53. This bath not only serves to lubricate the flexible coupling, but furthermore serves to indicate any leakage of water in such end of the tubing, it being clear that such leakage would cause the oil to overflow the wall 52 and run along the tubing to the deck house.

In order to facilitate repairing of the flexible coupling 27 and adjacent parts, I preferably construct the tubing with some adjustment for conveniently exposing these parts in such an emergency. As an easy and convenient means for accomplishing this function, when using a one-piece tubing, I space the motor 10 sufficiently far from the end of the tubing to permit longitudinal movement of the tubing toward the motor to the position indicated in broken lines in Fig. 2, thus exposing the flexible coupling 27 and adjacent parts.

Having thus described my invention, what I claim as new and desire to secure by Letters Patent of the United States is:

1. In combination, a power unit within a housing, a driven unit spaced from the power unit and located within a second housing, shafting including a coupling providing a driving connection between the two units whereby to drive the driven unit, tubular means including a cylindrical member enclosing said connection from outside exposure, means sealing the two ends of the tubular means to said two housings respectively, said coupling being adjacent to one end of the tubular means, and a wall carried by the interior of the cylindrical member in position to confine oil to said one end of the member and in contact with the coupling.

2. In combination, a power unit within a housing, a driven unit spaced from the power unit and located within a second housing, shafting providing a driving connection between the two units whereby to drive the driven unit, a one-piece tubular member enclosing said connection from outside exposure, means sealing the two ends of the tubular member to said two housings respectively, and means for forcing the tubular member longitudinally toward the second housing and holding it in sealed relation therewith, the other end of the tubular member being spaced from the power unit sufficiently to permit longitudinal movement of the tubular member to expose the shafting adjacent to the second housing.

3. In combination with a ship structure, a power unit, a driven unit within a housing, a wall of the ship structure located between the units, shafting including a coupling adjacent to the housing passing through the wall and providing a driving connection from the power unit to the driven unit, a tubular member enclosing the shaft from outside exposure at one side of the wall, and means sealing the two end portions of the tubular member to said housing and said wall respectively, the wall having an opening therethrough in alignment with and of a size permitting passage of the tubular member therethrough and the power unit being spaced from the wall sufficiently to permit longitudinal adjustment of the member toward the power unit sufficient to expose said coupling.

4. In combination, a power unit within a housing, a driven unit spaced from the power unit and located within a second housing, shafting providing a driving connection between the two units whereby to drive the driven unit, tubular means enclosing said connection from outside exposure, packing between one end of the tubular means and one housing, means providing an auxiliary sealing contact between the said one housing and the exterior of the tubular means adjacent to the said one end of the tubular means, means for holding the tubular means pressed tightly into contact with the packing, and means including packing in tight contact with the exterior of the tubular means adjacent to and sealing the tubular means relative to the other housing.

RALPH F. SYMONDS.